United States Patent [19]

Batchelder et al.

[11] Patent Number: 5,442,438
[45] Date of Patent: Aug. 15, 1995

[54] SPECTROSCOPIC APPARATUS AND METHODS

[75] Inventors: David N. Batchelder, London; Chunwei Cheng, Yorkshire, both of United Kingdom

[73] Assignee: Renishaw PLC, Gloucestershire, United Kingdom

[21] Appl. No.: 976,513

[22] Filed: Nov. 13, 1992

Related U.S. Application Data

[63] Continuation-in-part of Ser. No. 543,729, Aug. 6, 1990, Pat. No. 5,194,913.

[30] Foreign Application Priority Data

| Dec. 22, 1988 | [GB] | United Kingdom | 8830039 |
| Nov. 16, 1991 | [GB] | United Kingdom | 9124408 |
| Nov. 16, 1991 | [GB] | United Kingdom | 9124409 |
| Feb. 7, 1992 | [GB] | United Kingdom | 9202588 |
| Jun. 20, 1992 | [GB] | United Kingdom | 9213120 |
| Jun. 20, 1992 | [GB] | United Kingdom | 9213121 |

[51] Int. Cl.$^6$ ............................................. G01J 3/44
[52] U.S. Cl. .................................... 356/301; 356/326
[58] Field of Search ............... 356/301, 326, 323, 328, 356/331–334; 359/15

[56] References Cited

U.S. PATENT DOCUMENTS

| 3,625,613 | 12/1971 | Abell et al. | 356/301 |
| 3,733,131 | 5/1973 | Mould . | |
| 3,853,404 | 12/1974 | Barrett . | |
| 3,914,055 | 10/1975 | Wolga et al. | 356/301 |
| 3,999,854 | 12/1976 | Barrett . | |
| 4,030,827 | 6/1977 | Delhaye et al. . | |
| 4,081,215 | 3/1978 | Penney et al. . | |
| 4,195,930 | 4/1980 | Delhaye et al. | 356/301 |
| 4,397,556 | 8/1983 | Muller | 356/301 |
| 4,586,819 | 5/1986 | Tochigi et al. | 356/301 |
| 4,648,714 | 3/1987 | Benner et al. | 356/301 |
| 5,011,284 | 4/1991 | Tedesco et al. | 356/301 |
| 5,112,127 | 5/1992 | Carrabba et al. | 356/301 |
| 5,153,670 | 10/1992 | Jannson et al. | 356/301 |
| 5,166,813 | 11/1992 | Metz | 359/15 |

FOREIGN PATENT DOCUMENTS

| 0324583A3 | 7/1989 | European Pat. Off. . |
| 0465350A1 | 1/1992 | European Pat. Off. . |
| 2130269 | 11/1972 | France . |
| 2935812A1 | 3/1981 | Germany . |
| 4017317A1 | 12/1991 | Germany . |
| 62-269048 | 11/1987 | Japan . |
| 1345642 | 1/1974 | United Kingdom . |
| 1577198 | 10/1980 | United Kingdom . |
| WO92/17806 | 10/1992 | WIPO . |

OTHER PUBLICATIONS

Denton et al., "Charge-Injection and Charge Coupled Devices in Practical Chemical Analysis", American Chemical Society, 1983.

B. Yang, M. D. Morris, and H. Owen, Applied Spectroscopy, vol. 45, pp. 1553–1556 (1991).

K. L. Liu, L.-H. Cheng, R.-S. Sheng, and M. D. Morris, Applied Spectroscopy, vol. 45, pp. 1717–1720 (1991).

"Scanning Multichannel Technique for Improved Spectrochemical Measurements with a CCD Camera and its Application to Raman Spectroscopy", V. Deckert et al., Applied Spectroscopy, vol. 46, No. 2, 1992, pp. 322–328.

(List continued on next page.)

Primary Examiner—Vincent P. McGraw
Assistant Examiner—K. P. Hantis
Attorney, Agent, or Firm—Oliff & Berridge

[57] ABSTRACT

A sample placed under a microscope is illuminated by light from a laser beam. Raman scattered light is passed back via a dichroic filter to various optical components which analyse the Raman spectrum, and thence to a CCD detector. The optical components for analysing the Raman spectrum include tunable dielectric filters in a filter wheel; a Fabry-Perot etalon; and a diffraction grating. These various components may be swapped into the optical path as desired, for example using movable mirrors, enabling the apparatus to be used very flexibly for a variety of different analysis procedures. Various novel analysis methods are also described.

4 Claims, 5 Drawing Sheets

OTHER PUBLICATIONS

"Improving Spectroscopic Techniques by a Scanning Multichannel Method", P. Knoll et al., Applied Spectroscopy, vol. 44, No. 5, 1990, pp. 776–782.

INSIGHT Brochure, Meridian Instruments, Inc. 4 pgs. copyrighted 1991.

Hadamard Transform Raman Imaging, Patrick J. Treado et al., Applied Spectroscopy, vol. 42, No. 5, 1988, pp. 897–900.

Hadamard Transform Raman Microscopy of Laser-Modified Graphite Electrodes, Patrick J. Treado et al., Applied Spectroscopy, vol. 44, No. 8, 1990, pp. 1270–1275.

Optical Sectioning Raman Microscopy, Anurag Govil et al., Applied Spectroscopy, vol. 45, No. 10, 1991, pp. 1604–1606.

Raman Holographic Edge Filters, POC Physical Optics Corporation, Torrance, Calif.

Holographic Notch Filter, Kaiser Optical Systems, Inc., Glen Spectra Limited.

Raman Shifts Into Industry, Physics World, Oct. 1991, pp. 19–20.

Flaugh et al. "Development of a New Optical Wavelength Rejection Filter: Demonstration of its Utility in Raman Spectroscopy", Applied Spectroscopy, vol. 38, #6, Nov.–Dec. 1984.

Asher et al. "Crystalline Colloidal Bragg Diffraction Devices", Spectroscopy, vol. 1, No. 12, 1986, pp. 26–31.

Batchelder "Multichannel Raman Spectroscopy with a Cooled CCD Imaging Detector", ESN–European Spectroscopy News, 90, 1988, pp. 28, 32, 34.

Delhaye et al. "Raman Microprobe and Microscope with Laser Excitation", Journal of Raman Spectroscopy, 3 (1975) pp. 33–43.

Karger et al., "Laser Raman Spectrometer for Process Control", Applied Optics, Vl. 12, No. 9, Sep. 1973, pp. 2083–2087.

"Optical Determination of Crystal Axis Orientation in Silicon Fragments or Devices", IMB Technical Disclosure Bulletin, vol. 27, No. 7A, Dec. 1984.

Duncan et al. "Imaging Biological Compounds Using the Coherent Anti-Strokes Raman Scattering Microscope", Optical Engineering, vol. 24, No. 2, Apr. 1985, pp. 352–355.

Dhamelincourt, "Laser Molecular Microprobe", Source Unknown, pp. 48–53.

The Utilization of a Holographic Bragg Diffraction Filter For Rayleigh Line Rejection in Raman Spectroscopy, Michael M. Carrabba et al., Applied Spectroscopy, vol. 44, Nov. 9, 1990 pp. 1558–1561.

SPECTROSCOPIC APPARATUS AND METHODS

CROSS-REFERENCE TO RELATED APPLICATIONS

This application is a continuation-in-part of U.S. patent application Ser. No. 07/543,729 filed Aug. 6th, 1990, and issued Mar. 16, 1993 as U.S. Pat. No. 5,194,913 which is the U.S. national stage of international patent application no. PCT/GB89/01532 filed Dec. 22nd, 1989.

FIELD OF THE INVENTION

This invention relates to spectroscopic apparatus and methods. It is particularly useful in Raman spectroscopy, though it can equally be used in other forms of spectroscopy, e.g. using narrow-line photoluminescence, fluorescence or cathodo-luminescence.

DESCRIPTION OF PRIOR ART

The Raman effect is a phenomenon in which a sample scatters incident light of a given frequency, into a frequency spectrum which has lines caused by interaction of the incident light with the molecules making up the sample. Different molecular species have different characteristic Raman spectra, and so the effect can be used to analyse the molecular species present.

A prior Raman analysis apparatus is described in a paper "Raman Microprobe and Microscope with Laser Excitation", M. Delhaye and P. Dhamelincourt, Journal of Raman Spectroscopy, 3 (1975), 33–43. A sample is irradiated with monochromatic light from a laser, and the scattered light is passed through a monochromator in order to select a particular line of the resulting Raman spectrum. The monochromator comprises an entrance slit, onto which an optical system of the apparatus focuses an image of an illuminated point or line on the sample. A further optical system focuses an image of the entrance slit onto an exit slit. Between the entrance slit and the exit slit the monochromator has a dispersive device such as a diffraction grating, which has the effect of splitting the incoming Raman spectrum into a range of angles, depending upon frequency. The relative positioning of the exit slit and the diffraction grating thus selects the desired line of interest in the Raman spectrum.

Our earlier International Patent Specification WO 90/07108 and corresponding U.S. patent application Ser. No. 07/543,729, which issued as U.S. Pat. No. 5,194,912 on Mar. 16, 1993, describes a Raman analysis apparatus in which the monochromator (with its entrance slit, exit slit and diffraction grating) is replaced by a tunable non-dispersive filter, such as a multi-layer dielectric interference filter. It also discloses that a Fabry-Perot interferometer may be used in place of the multi-layer dielectric interference filter. This specification is incorporated herein by reference.

SUMMARY OF THE INVENTION

The present invention has several novel aspects.

One aspect provides a spectroscopic apparatus with at least two means of different types for selecting a desired frequency of the spectrum, at least one of the selecting means being capable of selective insertion into and removal from the optical path. This increases the flexibility of the apparatus since the user is able to select which type of selecting means to use. Optionally it may be possible to use two different types in series.

Another aspect of the invention provides holographic filter means in the optical path for rejecting Rayleigh scattered light received from the sample, and is characterised in that light for illuminating the sample is directed to the holographic filter means at such an angle that the holographic filter means directs the illuminating light towards the sample.

Further aspects of the invention provide novel methods of operating an spectroscopic apparatus.

BRIEF DESCRIPTION OF THE DRAWINGS

The various novel aspects of the present invention will be illustrated by way of example, with reference to the accompanying drawings, wherein.

DESCRIPTION OF PREFERRED EMBODIMENTS

Figure 1:
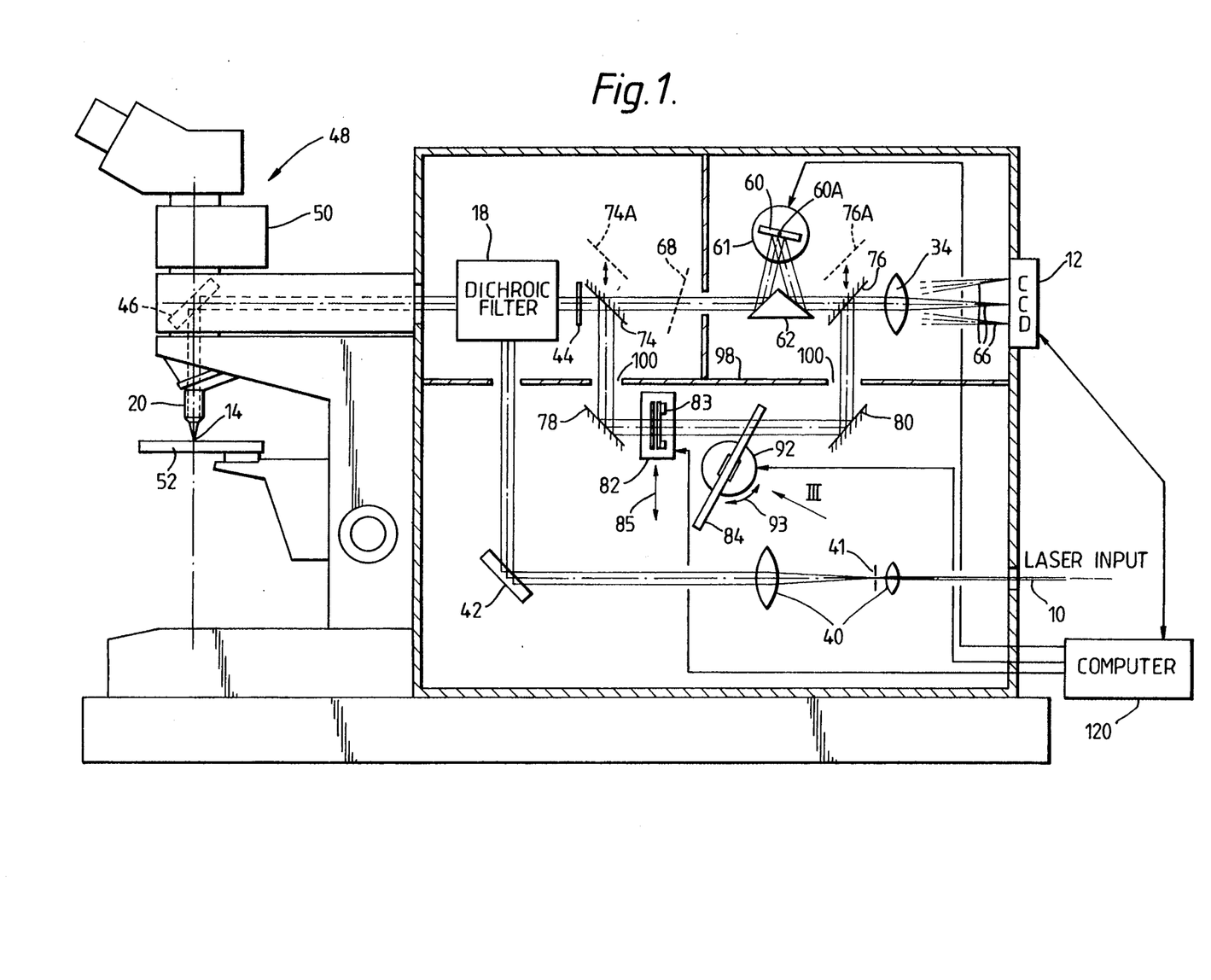
FIG. 1 is a schematic diagram of a first arrangement of a Raman analysis apparatus.

The apparatus of FIG. 1 is a modified version of that described in WO 90/07108. A laser input beam 10 passes through a lens system 40, which may include a spatial filter (e.g. a pinhole 41) to improve beam quality. The spatial filter removes unwanted imperfections in the original laser beam, e.g. caused by reflections, which would cause interference effects when the beam is subsequently focused to a spot on a sample.

The laser beam 10 is then reflected by a mirror 42 to a dichroic filter arrangement 18, described below in relation to FIG. 2. This filter arrangement reflects light having the frequency of the input beam 10, but transmits light of all other frequencies. The laser light is reflected through 90° by the filter arrangement 18 and passed via a further mirror 46 to a microscope objective 20, which focuses it to a small spot on a sample 14. The mirror 46 and objective 20 are provided as part of a conventional optical microscope 48. The mirror 46 can be removed to permit ordinary use of the microscope 48, e.g. to permit setting-up and ordinary optical examination of the sample 14. For these purposes, the microscope 48 has a source 50 of white light above the mirror 46 for illuminating the sample. In an alternative embodiment, the mirror 46 may be positioned above light source 50. This arrangement has improved safety characteristics and also allows a white light image of the sample to be formed on a photo-detector array 12 described below. The sample 14 is placed on a movable table 52, which may be movable not only in the vertical direction for focusing purposes, but also in the horizontal x and y directions. This allows x-y scanning to permit different points on the surface of the sample to be illuminated by the spot. The incoming laser beam may also be defocused, e.g. by adjusting the lens system 40, in order to illuminate an area on the sample 14.

The light scattered by the sample from the illuminated spot on the surface passes back via the microscope objective 20 and the mirror 46 to the filter 18, which transmits the Raman spectrum but rejects Rayleigh scattered light having the same frequency as the input laser beam. The transmitted Raman spectrum is taken via various optical components described below and focused by a lens 34 onto a two-dimensional photodetector array in the form of a charge-coupled device (CCD) 12. A computer 120 acquires data from the CCD 12 for subsequent data processing, and also controls the operation of many other parts of the apparatus.

As in WO90/07108, the filter arrangement 18 may use a conventional dichroic filter placed at 45° to the optical path, to reflect the incoming laser light through 90° towards the microscope. It is also possible to use a holographic Bragg diffraction filter at 45° for the dichroic filter. However, the preferred embodiment uses a holographic Bragg diffraction filter in a novel manner, which will now be described with reference to FIG. 2.

A paper entitled "The Utilisation of a Holographic Bragg Diffraction Filter for Rayleigh Line Rejection in Raman Spectroscopy" by Michael M. Carrabba et al, Applied Spectroscopy, vol 44, (1990), no.9, 1558–1561 discussed the advantageous characteristics of holographic Bragg diffraction filters for the purpose of rejecting the Rayleigh scattered light and transmitting the Raman spectrum. Such filters were originally intended for use either normal to the optical path or at very low angles of incidence. Recent technical advances mean that they can also be used at 45° to the optical path in the manner suggested for the dichroic filter in WO90/07108. When used at 45°, however, they are sensitive to the polarisation state of the incoming laser beam and of the Raman scattered light. Moreover, at 45° they are less capable of accepting Raman scattered light which is close to the Rayleigh line than when they are used at or near normal incidence.

Figure 2:
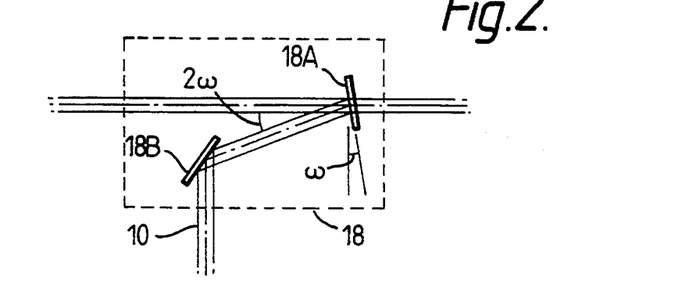
FIG. 2 is a schematic diagram showing details of a filter arrangement in FIG. 1.

FIG. 2 shows that a holographic Bragg diffraction filter 18A of the type described in the above mentioned paper by Carrabba et al is used for the filter 18 of FIG. 1, but in a novel arrangement. Suitable filters may be obtained commercially from Physical Optics Corporation, 2545 W.237th Street, Suite B, Torrance, Calif. 90505, U.S.A., or from Kaiser Optical Systems Inc., 371 Parkland Plaza, P.O. Box 983, Ann Arbor, Mich. 48106, U.S.A. These filters are also sold as holographic edge filters or holographic notch filters.

The holographic filter 18A in FIG. 2 is orientated at a low angle of incidence $\omega$ to the optical path, e.g. 10°. This angle is sufficiently low that the filter is still capable of efficiently rejecting the Rayleigh light, while giving good pass characteristics for the Raman scattered light. However, this angle also enables the filter 18A to reflect the input laser beam 10 along the optical path, from a mirror 18B. The mirror 18B receives the input laser beam 10 from the mirror 42, and directs it towards the filter 18A, at an angle $2\omega$ relative to the optical path between the microscope 48 and the filters 18A. That is, the angle $2\omega$ is twice the chosen angle of incidence for the light on the filter 18A, e.g. 20° where the angle of incidence is 10°.

The filter 18A is thus able to fulfil the dual function of rejecting the Rayleigh scattered light and introducing the input laser beam, reflecting it along the optical path towards the microscope, without the disadvantages noted above which arise if a holographic filter is used at 45°. This novel holographic filter arrangement is not restricted to the present Raman apparatus. Rather, by directing the input laser beam at a suitable angle, e.g. using the mirror 18B, the filter 18A can serve this dual purpose in many other types of spectroscopic apparatus, including conventional Raman and other spectrometers using monochromators for analysing the scattered spectrum.

Referring back to FIG. 1, an optional polarising filter 44 is provided in the path of the light from the microscope objective 20 to the CCD 12. This can be inserted into or removed from the optical path, as desired, and is rotatable about the optical axis to vary the direction of polarisation. This enables investigation of the polarisation state (if any) of any particular Raman line under investigation, which can yield additional useful information when analysing some samples. If desired a half wave plate may be inserted between filters 18 and 44, or up-beam of filter 18, to rotate the plane of polarisation.

Between the filters 18,44 and the CCD 12, the scattered light may take either of two possible paths, depending upon the positions of two movable mirrors 74,76. When these mirrors are slid into the positions shown in solid lines in FIG. 1, the light is reflected via further fixed mirrors 78,80 and through a Fabry-Perot etalon 82 and a Raman analysis filter wheel 84. The Fabry-Perot etalon 82 is slidable into and out of the optical path, as indicated by an arrow 85. Alternatively, it may be fixed, and can be brought into and out of the optical path using further movable mirrors. The Fabry-Perot etalon 82 may be placed after the filter wheel 84 instead of before it, if desired. The sliding of the mirrors 74,76 and of the etalon 82 may be controlled by the computer 120.

The arrangement for sliding the mirrors 74,76 into and out of the optical path should preferably include precision stops such that they may be returned precisely to the alignment shown in FIG. 1 when they are placed into the optical path. This prevents angular misalignments of the beam when reflected via the mirrors 78,80. If desired, the sliding of the mirrors 74,76 may be on a precision slide normal to the plane of FIG. 1, instead of as shown. Alternatively, the mirrors may be hinged in and out of the optical path. Another alternative is to use two movable pentaprisms in place of the two mirrors 74,76, in order to ensure that the light is reflected through 90° even if a pentaprism is misaligned when returned into the optical path. The etalon 82 may be mounted on a similar precision slide.

Figure 3:
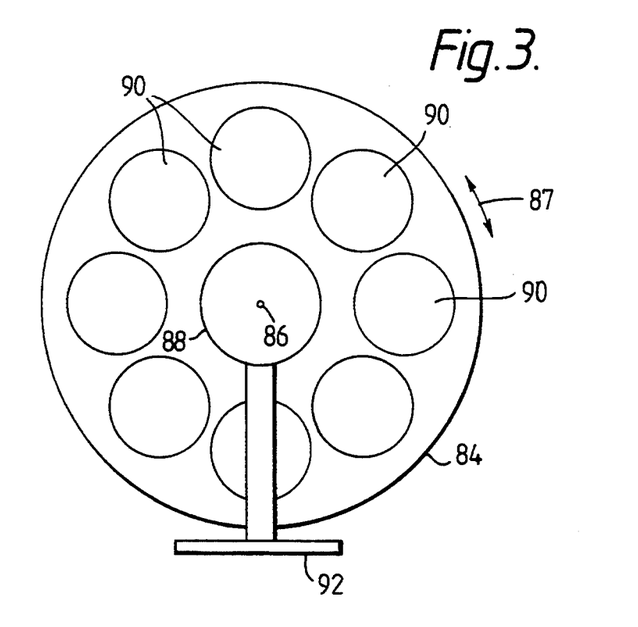
FIG. 3 is a view of a component of the apparatus, in the direction of the arrow III in FIG. 1, FIGS. 4 and 5 are graphs of the transmission characteristics of components of the apparatus.

The filter wheel 84 is shown in more detail in FIG. 3. It comprises a plurality of windows, each containing a multilayer dielectric bandpass filter 90 covering a different band of the Raman spectrum which is to be analysed. The wheel is rotatable about an axis 86, as indicated by arrow 87. It can be indexed so that any desired one of the filters 90 can be placed in the optical path, by means of an indexing motor 88 under the control of the computer 120. This provides a coarse selection of the region of the Raman spectrum of interest. If it is desired to be able to use the etalon 82 without a filter 90, one of the windows in the wheel 84 may be empty.

As described in specification no. WO90/07108, the passband of the selected filter 90 can be tuned, by rotating it about an axis perpendicular to the optical path. To achieve this, the filter wheel 84 is mounted on a rotatable table or stage 92, for rotation to any desired angle as indicated by the arrow 93 in FIG. 1, again under the control of the computer 120. By removing the Fabry-Perot etalon 82, Raman analysis may now be carried out in exactly the same way as described in WO90/07108. Light from the Raman band to which the filter 90 has been tuned is focused on the CCD 12 by the lens 34. It is possible to focus a two-dimensional image of an illuminated area on the sample 14 onto the CCD (in the selected Raman band). Alternatively it is possible to illuminate just a point on the sample and analyse the Raman scattered light from that point.

Figure 4:
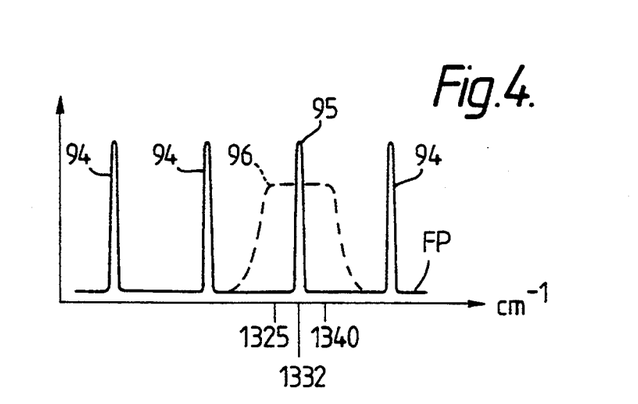

The Fabry-Perot etalon 82 is of the scanning type, which can be purchased off-the-shelf. The construction of such devices being well known, it is shown only schematically in FIG. 1. It may include two parallel plates, the spacing of which can be adjusted under the control of the computer 120 by piezoelectric actuators 83 (other actuators e.g. electrostrictive may be used). Other commercially available types of Fabry-Perot etalon may also be used. FIG. 4 shows the transmission characteristics of the etalon 82, i.e. how the response varies with the wavenumber of the incident light (in $cm^{-1}$). The transmission characteristic, shown by a solid line FP in FIG. 4, has a comb-like nature, with sharply-defined peaks 94,95 which occur at intervals within the wavenumber spectrum defined by the spacing of the two parallel plates. Using the piezoelectric actuator to alter the spacing of the plates, the peaks 94,95 of the transmission characteristic can be caused to scan up and down the spectrum.

In an example in which the filter wheel 84 is used alone, without the Fabry-Perot etalon 82, it is possible to scan the Raman spectrum from 200 $cm^{-1}$ through to 3500 $cm^{-1}$, at a resolution of, say 1 $cm^{-1}$, by selecting appropriate filters in the windows 90 in turn, and by rotating the stage 92 to tune the filters. However, higher resolution can be achieved by sliding the Fabry-Perot etalon 82 into the optical path in series with the selected filter of the filter wheel 84. FIG. 4 illustrates this for an example in which it is desired to analyse a diamond film. An appropriate filter of the filter wheel 84 is selected and rotated on the stage 92, so that its transmission characteristic (broken line 96) is centred on 1332 $cm^{-1}$, which coincides with a characteristic Raman peak of diamond. Fine tuning is now carried out using the piezoelectric actuator 83, to cause the peak 95 of the Fabry-Perot transmission characteristic to scan between 1325 $cm^{-1}$ and 1340 $cm^{-1}$. This permits scanning of the characteristic peak in the diamond spectrum with a spectral resolution of, say, 0.2 $cm^{-1}$, enabling an accurate determination of the parameters of the peak. While doing so, it is possible to focus a two-dimensional image of the surface of the diamond film on the CCD 12, so as to determine how its characteristics (e.g. a spatial map of strain in the aforementioned thin film) vary from place to place.

Of course, the same technique can be used to provide analysis at high resolution of the characteristic peaks of other substances. For example, strain in a silicon surface affects its Raman peaks. To study this, an appropriate filter 90 from the filter wheel 84 is indexed into the optical path, and rotated by means of the stage 92 to pass a band around the silicon peak of interest. The piezoelectric actuator 83 is then used to scan within this selected passband, and changes in the image received by the CCD show how the strain varies across the surface.

Figure 5:
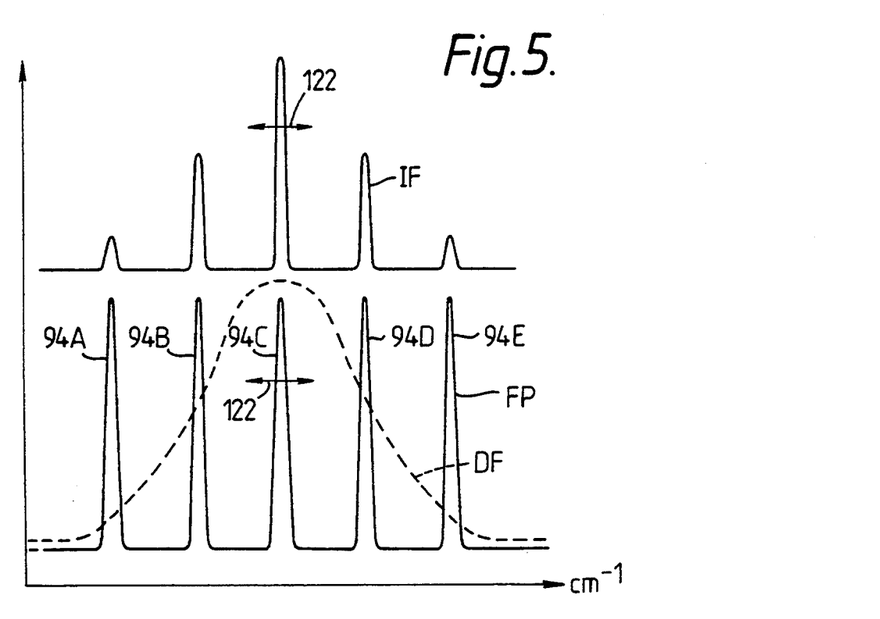
Figure 6:
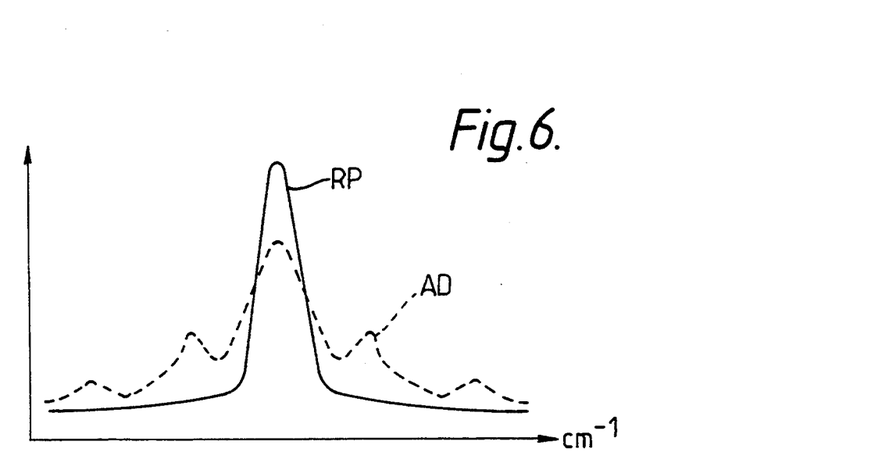
FIG. 6 is a graph showing the response of parts of the apparatus to a single line of a Raman spectrum.

FIGS. 5 and 6 illustrate a novel method of use of the apparatus. The response FP of the Fabry-Perot etalon 82 is shown in FIG. 5 as a series of sharp, equally-spaced peaks 94A–E. When the Fabry-Perot etalon 82 is scanned by applying a varying voltage to the piezoelectric actuators 83, under control from the computer 120, the peaks 94A–E are scanned up or down the spectral range, as indicated by arrows 122. FIG. 5 also shows the spectral response DF of a dielectric filter which may be selected in the wheel 84. This has a single, much broader peak which can also be scanned up and down the spectral range as indicated by the arrow 122, by tilting the filter under control of the computer 120.

The overall response (the instrument function) of the series combination of the Fabry-Perot etalon 82 and the dielectric filter in the wheel 84 is shown at IF in FIG. 5 (the vertical scale of the graph has been shifted for clarity). The instrument function IF may be considered as the result of multiplying the response DF by the response FP. It consists of a sharp central peak surrounded by a few subsidiary peaks.

To examine the complete Raman spectrum scattered by the sample 14, the computer 120 is programmed to scan both the Fabry-Perot etalon and the dielectric filter simultaneously, e.g. so that their responses scan towards the right in FIG. 5 at the same rate. Initially, this is done in such a manner as to keep the peak 94C of the Fabry-Perot response centralised within the peak of the filter response DF. However, it is not possible to scan a Fabry-Perot peak over a wide spectral range. The following technique is therefore adopted. When the peaks have scanned through a small range of wavenumbers equivalent to the spacing between two adjacent peaks 94C,94D, and before the maximum permissible voltage has been applied to the piezoelectric actuators 83, the Fabry-Perot etalon 82 is commanded by the computer 120 to skip back to the beginning of the range of its scanning. The filter peak DF now coincides not with the Fabry-Perot peak 94C, but with the next order peak 94D. The scanning continues, with the computer 120 keeping the peak 94D centred in the peak DF. Again, before the Fabry-Perot etalon 82 reaches the end of its permissible scanning range, the computer commands it to skip back an order, so that the peak 94E now coincides with the peak DF. This process can be continued for a very wide spectral range, limited only by the performance of the dielectric filter. By changing the dielectric filter, the spectral range can be extended still further.

FIG. 6 shows a typical example of a graph of the acquired data AD which the instrument generates as a result of such a scanning process, which can if required be displayed by the computer 120. In the example shown, the data AD may have been produced as a result of a single Raman peak RP. It will be noted that in addition to the main peak, the curve AD has subsidiary peaks corresponding to the subsidiary peaks of the instrument function IF seen in FIG. 5. These subsidiary peaks are removed by a data processing operation carried out in the computer 120, so that the peak RP may be clearly displayed if required. The data processing operation will not be described in detail, as a suitable computer programme can be devised by a man skilled in the art. The necessary algorithm involves deconvolution of the acquired data AD with the instrument function IF, and a suitable algorithm which may be adapted for this purpose is Janson's method. As a preliminary to this data processing method, the instrument function IF may be derived by using the instrument to scan a light input having known characteristics, e.g. the light of the laser input 10 of the instrument.

Alternatively, it is possible to use a dielectric filter having a rather narrower peak than that shown at DF. In this case, the instrument function does not have any substantial subsidiary peaks, and deconvolution is unnecessary.

Referring again to FIG. 1, instead of the filter wheel 84 and Fabry-Perot etalon 82 the alternative optical path between the filters 18,44 and the CCD 12 may be selected as follows. The movable mirrors 74,76 are slid out of the optical path, for example by the computer 120, to positions indicated by broken lines 74A,76A. The scattered light then passes instead to a reflection-type diffraction grating 60, via an isosceles prism 62 having mirrored surfaces. The grating 60, e.g. having 1200 lines/mm, is mounted on a precision rotary table or stage 61 so as to be rotatable about an axis 60A normal to the plane of the paper, under control from the computer 120. The input laser beam is focused to a single point on the sample 14.

Figure 7:
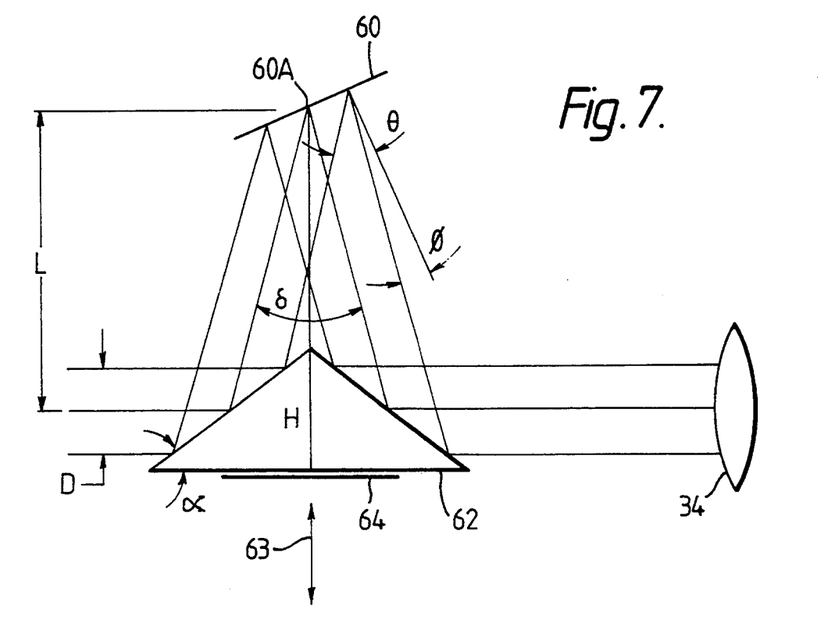
FIG. 7 is a ray diagram of another part of the apparatus.

FIG. 7 shows the arrangement of the diffraction grating 60 in more detail. The Raman scattered light emerges from the microscope as a parallel beam of diameter D from the left of the figure. The isosceles prism 62 with reflecting coatings deflects the beam through an angle $2\alpha$, the prism angle being $\alpha$. Optionally, the prism can be moved in and out of the Raman scattered beam on a precision slide 64 normal to the plane of the paper (shown only schematically in FIG. 7). The incident beam makes an angle $\theta$ with the normal to the diffraction grating, which has line spacing d. The diffracted beam returns via an opposing face of the prism to the original path of the Raman scattered beam, and makes an angle $\phi$ with respect to the normal of the diffraction grating. Under these conditions the central wavelength $\lambda$ of the diffracted beam is given by:

$$\lambda = d\,(\sin\theta + \sin\phi) \tag{1}$$

The angle between the incident and diffracted beams is $\delta$ which is related to the angles of incidence and diffraction by $$\delta = \theta - \phi \tag{2}$$

In typical 0.5 to 1 m spectrometers the value of $\delta$ is usually in the range 20° to 30°. It is useful to use a value of $\delta$ in this range for the present embodiment of the invention as the properties of commercially available diffraction gratings will be matched to these angles for blaze. FIG. 7 has been drawn with $\delta = 30°$ to give an impression of sizes.

Fixing the value of $\delta$ determines the distance L between the rotation axis 60A of the grating and the centre of the prism. Using the notation of FIG. 7 it can be shown that $$\tan\delta/2 = \frac{H}{2L\tan\alpha} \tag{3}$$

where H is the height of the prism and $\alpha$ the prism angle. Furthermore the value of $\delta$ is related to $\alpha$ by $$\delta = \pi - 4\alpha \tag{4}$$

and $$L = \frac{H\tan 2\alpha}{2\tan\alpha} \tag{5}$$

FIG. 7 has been drawn assuming a value of H = 15 mm; with $\delta = 30°$ the prism angle $\alpha$ is 37.5°. Thus L in FIG. 7 has the value of 36.5 mm. It should of course be understood that these angles and dimensions are given merely as examples.

The lens 34 focuses the Raman scattered light onto the charge-coupled device (CCD) 12. The diffraction grating 60 disperses the various Raman wavelengths across the CCD 12 as indicated at 66 in FIG. 1. The dispersion across the CCD 12 is a function of $\theta$ and determines the range of the Raman spectrum obtained for a given angular position of the grating 60 about the rotational axis 60A (i.e. for a given angle $\theta$). Using the precision rotary table 61, the grating can be stepped to a variety of different angles $\theta$ so as to cover the entire range of Raman spectra which are to be investigated. For each angle $\theta$ the CCD 12 is calibrated in terms of the wave number (in cm$^{-1}$) corresponding to each pixel of the CCD (or each group of pixels binned together during subsequent signal processing and analysis).

For a 1200 lines/mm grating and $\delta = 30°$ equation (1) can be rewritten as $$\lambda = 833\ nm\,(\sin\theta + \sin(\theta - 30°)) \tag{6}$$

Assuming the CCD chip has 580 pixels, 20 μm square, then the active area is 12.8 mm long. If the focal length of the lens 34 is 300 mm then the active area subtends an angle of 2.3°. The dispersion $\Delta(1/\lambda)$ over the active area is then given by $$\Delta(1/\lambda) = \frac{482\ cm^{-1}\cos\phi}{(\sin\theta + \sin(\theta - 30°))^2} \tag{7}$$

The magnitudes of the dispersion for a variety of angles of incidence $\theta$ are illustrated in the following table:

| $\theta$ | $\phi$ | $\lambda$ | $1/\lambda$ | $\Delta(1/\lambda)$ |
|---|---|---|---|---|
| 30° | 0° | 416 nm | 24010 cm$^{-1}$ | 1928 cm$^{-1}$ |
| 40 | 10 | 680 | 14706 | 712 |
| 50 | 20 | 923 | 10834 | 369 |

Again, all the above values are given merely as examples.

A novel aspect of the apparatus of FIGS. 1 and 7 is that it does not need the entrance slit required by conventional monochromators using diffraction gratings. The small spot of laser light focused onto the sample 14 by the microscope objective 20 replaces the entrance slit. Neither does the apparatus need a conventional exit slit. A pixel (or a group of pixels binned together) of the CCD 12 replaces the exit slit. However, an entrance slit could be inserted if desired, and can provide confocal action as described in International Patent Application No. PCT/GB92/01026. Such an arrangement also has the advantage that the lenses associated with the slit can expand the beam so that it covers a larger area of the grating, increasing the spectral resolution.

Because the prism 62 is mounted on the precision slide 64, it can easily be removed when required. A direct image of the sample 14 is then obtained on the CCD 12, illuminating an area of the sample 14 with white light. Because of the precision slide 64, when the prism 62 is returned, its positioning relative to the diffraction grating 60 and the angles $\theta,\phi,\delta$ are unaffected. The dispersion of the Raman spectrum across the CCD 12 is likewise unaffected, so that there is no need to re-calibrate the CCD (that is, the same pixels of the CCD will still represent the same Raman wavelength). If desired, instead of the precision slide 64 normal to the plane of the paper, it is possible to arrange for the prism 62 to be removed and returned in the direction of the arrows 63 in FIG. 7. However, a precision stop should then be provided to ensure that the prism can be re-turned to the correct position relative to the grating 60.

Another novel aspect of the invention lies in the ability to swap easily between a first mode in which the diffraction grating 60 or other dispersive element is used, and a second mode in which a tunable non-dispersive element (the Fabry-Perot etalon 82 and/or a dielectric filter in the wheel 84) is used. The second mode has the advantage that the CCD can be used to image an area of the sample, at a given Raman wavelength, while the first mode uses the potential of the CCD to register a complete Raman spectrum simultaneously from a single point on the sample. Swapping between one mode and the other is easily achieved by moving the mirrors 74,76. In an alternative embodiment, swapping modes could be achieved by simply inserting a tunable dielectric filter or other tunable non-dispersive filter element in the place of the prism 62. The apparatus therefore has great versatility.

If desired, the prism 62 could be replaced by two separate mirrors. However, the prism is preferred since it is a solid optical element, the angles of which are fixed, whereas if two mirrors were employed then it would be necessary to ensure that the angle between them was precisely re-set every time they were removed and replaced.

Another possibility is to use an optical element 60 which is provided with the reflective diffraction grating on one surface, and with a plain mirror on the reverse surface. Such an optical element 60 can then be rotated so that the light is incident on the mirror instead of on the diffraction grating, with the mirror surface parallel to the optical path from the filter 18 to the CCD 12 ($\theta=\phi$). This has the same effect as removing the prism 62 so that a real image of an area of the sample surface can be formed on the CCD, illuminating the sample with white light. A tunable filter can then be moved into the optical path elsewhere, if desired, e.g. as illustrated at 68 in FIG. 1, illuminating the sample with the laser.

A method will now be described for using the diffraction grating 60 in conjunction with the CCD 12. The CCD 12 is a two-dimensional photodetector array, consisting of rows of pixels. As is well known, the reading out of data from a CCD is a sequential process, in which the charge accumulated in each pixel as a result of exposure to light is shifted into its neighbouring pixel along a row, the data from each pixel in the row being acquired sequentially by the computer 120 from the pixel at the end of the row. If desired, instead of using a CCD, the spectrum 66 may be focused along a one-dimensional (i.e. linear) photodetector array consisting of a single row of pixels, the data being read in an analogous sequential manner.

One disadvantage of the apparatus so far described is that, if the apparatus is set up to disperse the spectrum widely across the CCD 12, to provide high spectral resolution, then only a part of the spectrum can be received at any one time. To acquire data from a wider spectrum, one possible method is to expose one part of the spectrum onto the CCD 12 for a sufficient time, and then to read all of the data relating to that part of the spectrum from the CCD into the computer 120. Next the turntable 61 is indexed so that the next part of the spectrum is received by the CCD 12, sufficient exposure time is allowed, and all the data from that part of the spectrum is read into the computer. The above process is repeated as often as is necessary. However, this step-and-repeat method has a disadvantage during subsequent computer processing of the data, because it can be difficult to join together the separate blocks of data acquired from the separate parts of the spectrum. This is especially true if there have been changes in the background light level between the separate exposures, or if other conditions have altered.

Figure 8:
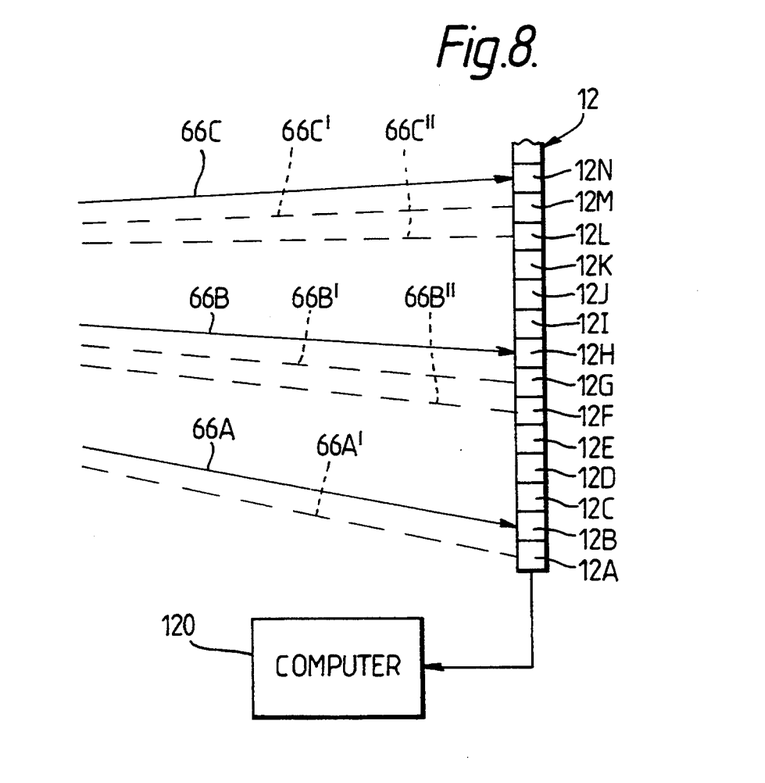
FIG. 8 is a schematic diagram including part of a CCD detector.

An improved, novel data acquisition method is to operate the apparatus as illustrated in FIG. 8. This figure shows schematically a portion of one column or row of pixels 12A–N of the CCD 12. At a given point in time, a Raman spectrum dispersed along this column or row is as illustrated diagrammatically by rays 66A,66B,66C, each representing Raman scattered light of a different wavenumber. The general principle of the method is to scan these rays along the column or row of pixels, synchronously with the shifting of the charge from one pixel to the next and reading out the data from the end pixel 12A into the computer 120. Thus, after a short exposure time the computer 120 commands the CCD 12 to shift all the data by one pixel, whilst simultaneously commanding the turntable 61 to index the grating 60 by an amount equivalent to the spectral resolution between adjacent pixels. For example, the charge which has accumulated in pixel 12N is shifted into pixel 12M, while at the same time the ray 66C is shifted to the position shown by the broken line 66C'. At the same time, the charge accumulated in pixel 12H shifts to the pixel 12G and the ray 66B shifts to the position 66B'; and the charge accumulated in pixel 12B is shifted into pixel 12A, while the ray 66A shifts to the position 66A'. It can be seen that in this manner, the charge now present in pixels 12M,12G and 12A continues to accumulate in accordance with the relative intensities of the rays 66C, 66B, 66A respectively.

Next, after a further short exposure time, the same length as previously, the charge in each pixel is again shifted into its neighbouring pixel and simultaneously the grating 60 is again indexed by an amount equivalent to the spectral resolution between adjacent pixels. The accumulated charge from pixel 12M is thus shifted into pixel 12L and continues to accumulate charge in accordance with the intensity of the ray which has now shifted to the position 66C''. Similarly, the accumulated charge in pixel 12G is now shifted to pixel 12F, and continues to accumulate charge in accordance with the intensity of the ray now shifted into position 66B''. The accumulated charge from the pixel 12A, on the other hand, is shifted out of the end of the column or row of pixels and read into storage in the computer 120.

This process is repeated many times in order to acquire data from as wide a spectral range as desired. It will be appreciated that the only limit on the total width of the spectral range is imposed by the performance of the grating 60, and this range can be many times the width of the CCD 12, whilst maintaining high spectral resolution.

In practice, if the CCD 12 has m pixels in each column or row, then the computer 120 is programmed to ignore or discard the data from the first m−1 pixels read. This is because it is easier and more accurate to process data which has accumulated over the same total exposure time for each point in the spectrum, whereas these first m−1 points will have been exposed for a shorter total time than subsequent points. Each of the subsequent points will have been accumulated over a total exposure time t, equal to m×d seconds, where d is the delay time between each transfer of charge from one pixel to the next.

The time taken to scan a spectrum made up of n points is t+(n×t)/m. For example, if the CCD is 600 pixels wide and the desired total exposure time t is 10 seconds, then a spectrum having a spectral width equivalent to 6000 pixels can be scanned in 110 seconds. This is slightly longer than would be required for the step-and-repeat process discussed previously. However, since the present method involves a continuous scanning process instead of a discrete stepwise process, there are no problems during the subsequent data processing operation of joining together the separate blocks of data, should there have been changes in the background light level or other alterations of the conditions.

If the highest possible spectral resolution is not required, the software can use a technique called "binning", in which several adjacent pixels are treated as a group. The software adds together the data which it captures from the consecutive pixels in the group, and treats the result as one data point. One advantage is that the data intensity is increased. Alternatively, the exposure time may be reduced, giving faster scanning. Whether binning is used or not, a second advantage is that each data point is collected over every pixel in the column or row, so that errors caused by non-uniformity of the CCD response or by particles of dirt or dust are averaged out. A third advantage is that the effect of noise in the read-out circuits associated with the CCD is reduced.

Figure 9:
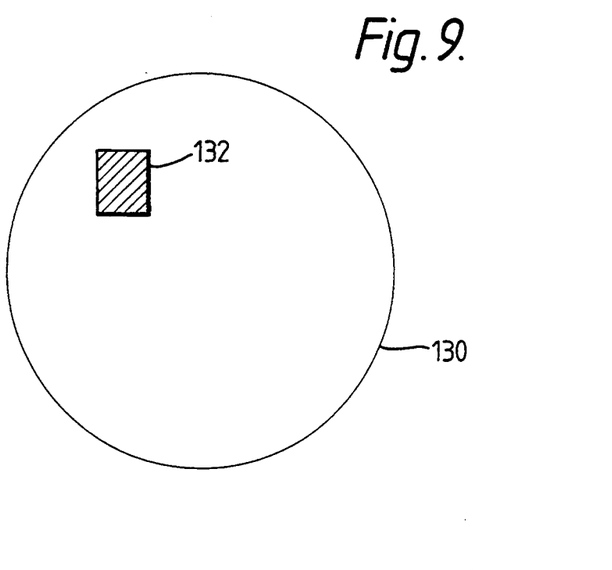
FIG. 9 is a diagram showing an illuminated area on a CCD detector.

FIG. 9 illustrates another novel method of use of the apparatus, when it is desired to use a filter in the filter wheel 84 to take a Raman spectrum of one particular point on the sample 14. Ordinarily, this would be performed by focusing the incoming laser beam to a spot at the point concerned, using the x-y table 52 to position the sample. In the present method, however, an area of the sample is illuminated by defocusing the incoming laser beam 10 (by adjusting the lens system 40). The mirrors 74,76 are positioned to direct the scattered light through the desired tunable filter in the filter wheel 84, and a two-dimensional image of the illuminated area is produced on the CCD 12. This illuminated area is indicated by the circle 130 in FIG. 9.

Next, the user selects a point or a small region within the illuminated area of the sample which he wishes to investigate. This selection is effected by binning together the corresponding pixels of the CCD 12, e.g. as shown by the box 132 in FIG. 9, so that the computer 120 will acquire data just from these pixels, treating them as a single unit. The selected point or region may be at any location on the sample within the area illuminated by the incoming laser beam. Finally, the computer 120 produces the desired Raman spectrum in the usual way, tuning the selected filter by rotating it whilst simultaneously acquiring data from the binned pixels in the region 132.

The method illustrated in FIG. 9 may be performed with a filter having any desired bandwidth, e.g. 2 cm$^{-1}$ or 20 cm$^{-1}$. The spectral range may also be increased as described above, by selecting various filters in the wheel 84 in turn. The method can also be used in conjunction with the above scanning methods using the Fabry-Perot etalon 82, if desired. The calibration of the tunable dielectric filter in the filter wheel 84 is shifted very slightly when used off axis in the present way, but this can be corrected by software in the computer 120 if necessary.

The apparatus of FIG. 1 may be provided with internal shielding, e.g. as indicated at 98, to prevent stray light from the input laser beam 10 reaching the CCD 12. Apertures 100 in this shielding, which permit the passage of the light beam when reflected via the Fabry-Perot etalon 82 and filter wheel 84 may be automatically closed by shutters when the mirrors 74,76 are moved out of the optical path. Further shielding may be provided between the components 82,84 and the components 40-42. A further dichroic filter to reject light of the laser frequency may be provided just before the CCD, e.g. between the mirror 76 and the lens 34, with further shielding around it.

Figure 10:
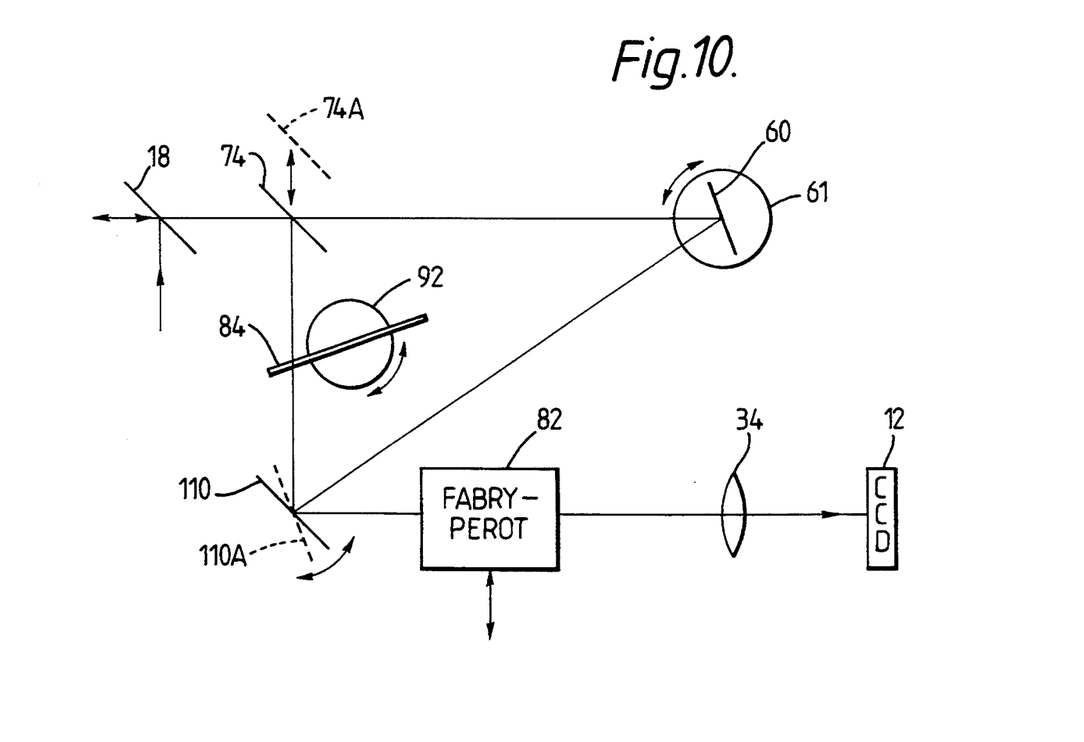
FIG. 10 is a schematic diagram of an alternative arrangement of the apparatus.

FIG. 10 shows an alternative arrangement of the optical components between the dichroic filter 18 and the CCD 12, and the same reference numerals have been used as in FIG. 1 where appropriate.

As previously, the scattered light can take either of two possible optical paths, depending whether a mirror 74 is placed in the optical path as shown by a solid line, or out of the optical path as shown by a broken line 74A.

With the mirror 74 in the optical path, the light is reflected through a selected filter of the filter wheel 84, which can be tuned by rotating the stage 92 in the same way as before. A mirror 110 reflects the light through 90° through the Fabry-Perot etalon 82. It is then focused by the lens 34 onto the CCD 12. As in FIG. 1, the filter wheel 84 and the Fabry-Perot etalon 82 may be used in conjunction with each other, or the Fabry-Perot etalon 82 may be removed from the optical path so that the Raman spectrum may be scanned at lower resolution by rotating the stage 92.

Alternatively, with the mirror 74 removed from the optical path, the scattered light passes directly to the diffraction grating 60 mounted on its rotary table 61. Depending on the orientation of the table 61, a selected diffracted ray is passed to the mirror 110. This mirror can be pivoted to the position shown by broken line 110A, so as to reflect the diffracted ray towards the CCD 12. As before, the Fabry-Perot etalon 82 may be used for fine tuning at high resolution, or it may be removed from the optical path if not required.

As previously, the rotary table 61 can be used to step from one range of a Raman spectrum to another. Also as previously, the diffraction grating may be an optical element 60 which has a plain mirror on its reverse side, which can be brought into use by rotating the optical element, in order to form a real image of the sample on the CCD 12.

As in the embodiment of FIG. 1, the arrangement of FIG. 10 requires no entrance or exit slits, relying instead on the focusing of the laser beam to a spot on the sample, and on a pixel or group of binned pixels on the CCD. It also has the advantage of not requiring the prism 62 shown in FIG. 1, although the prism is preferred if the diffraction grating is to be swapped for a tunable non-dispersive filter.

The arrangement of FIG. 10 has the advantage that the "throw" of the rays diffracted from the diffraction grating 60 can be greater than in FIG. 1 thus allowing for the use of a lens 34 of longer focal length, leading to higher resolution when the diffraction grating is used, with the added possibility of using the scanning Fabry-Perot etalon 82 in conjunction with the diffraction grating.

The above description has pointed out a number of novel features of the apparatus, and a number of novel methods. It will be appreciated that these may be used together or separately. It will also be appreciated that modifications may be made. For example, if two dimensional imaging of an area on the sample is not required, the CCD 12 may be replaced by a simpler detector such as an avalanche photodiode. Furthermore, although Raman scattered spectra have been discussed, the invention can be used to analyse other spectra, including narrow-line photoluminescence, fluorescence and cathodo-luminescence.

We claim:

1. A spectroscopic apparatus, comprising:

means for illuminating a sample so as to produce therefrom a spectrum of scattered light;
   a detector for detecting the scattered light;
   an optical path between the sample and the detector;
   means in the optical path for selecting a desired frequency of said spectrum received from the sample and passing it to the detector; and
   a filter in the optical path for rejecting Rayleigh scattered light received from the sample, said filter being oriented at a low angle of incidence to said optical path, said low angle of incidence greater than 0° and substantially less than 45°, wherein illuminating light from the illuminating means is directed to the filter at an angle relative to the optical path which is twice said low angle of incidence, such that the filter directs said illuminating light along said optical path towards the sample.

2. The apparatus according to claim 1 wherein said spectrum is a spectrum of Raman scattered light.

3. The apparatus according to claim 1, wherein the low angle of incidence is about 10°.

4. The spectroscopic apparatus according to claim 1, wherein the filter is a holographic filter.

* * * * *

UNITED STATES PATENT AND TRADEMARK OFFICE
CERTIFICATE OF CORRECTION

PATENT NO. : 5,442,438
DATED : August 15, 1995
INVENTOR(S) : David N. BATCHELDER et al.

It is certified that error appears in the above-indentified patent and that said Letters Patent is hereby corrected as shown below:

Title page

Item 63, line 2, please change "5,194,913" to --5,194,912--.

Signed and Sealed this

Twentieth Day of February, 1996

Attest:

Attesting Officer

BRUCE LEHMAN
Commissioner of Patents and Trademarks